(12) United States Patent
Scaggs (10) Patent No.: US 12,313,454 B2
(45) Date of Patent: May 27, 2025

(54) SYSTEM AND METHOD FOR PROFILING A LASER BEAM OVER A GALVANOMETER SCAN FIELD

(71) Applicant: Haas Laser Technologies, Inc., Flanders, NJ (US)

(72) Inventor: Michael J. Scaggs, Clearwater, FL (US)

(73) Assignee: Haas Laser Technologies, Inc., Flanders, NJ (US)

( * ) Notice: Subject to any disclaimer, the term of this patent is extended or adjusted under 35 U.S.C. 154(b) by 114 days.

(21) Appl. No.: 17/967,295

(22) Filed: Oct. 17, 2022

(65) Prior Publication Data

US 2024/0125645 A1    Apr. 18, 2024

(51) Int. Cl.
*G01J 1/42* (2006.01)
*G01J 1/04* (2006.01)

(52) U.S. Cl.
CPC .......... *G01J 1/4257* (2013.01); *G01J 1/0411* (2013.01)

(58) Field of Classification Search
CPC ...... G01J 1/4257; G01J 1/0411; H01S 3/0014
See application file for complete search history.

(56) References Cited

U.S. PATENT DOCUMENTS

| 8,619,247 | B1 * | 12/2013 | Scaggs ................. | B23K 26/705 |
| | | | | 356/138 |
| 10,184,828 | B2 | 1/2019 | Kramer et al. | |
| 10,908,018 | B2 | 2/2021 | Kramer et al. | |
| 10,976,219 | B2 | 4/2021 | Ream et al. | |
| 2008/0192322 | A1 * | 8/2008 | Scaggs ................. | G02B 26/101 |
| | | | | 359/206.1 |
| 2018/0029164 | A1 * | 2/2018 | Kramer ............... | B23K 26/705 |
| 2020/0036936 | A1 * | 1/2020 | Scaggs .................... | H04N 5/72 |
| 2020/0241250 | A1 * | 7/2020 | Kim ....................... | G02B 13/24 |

FOREIGN PATENT DOCUMENTS

WO    WO-2015185152 A1 * 12/2015    ........... H01S 3/0014

* cited by examiner

*Primary Examiner* — Uzma Alam
*Assistant Examiner* — Justin J Van Cleave
(74) *Attorney, Agent, or Firm* — Molly L. Sauter; Smith & Hopen, P.A.

(57) ABSTRACT

A system and method for profiling a focused laser beam of a galvanometer scanner which includes an attenuation optic, wherein the attenuation optic includes a first meniscus lens to face the focused laser beam source, wherein the first meniscus lens is tilted at a fixed angle of incidence relative to an optical axis of the focused laser beam and a second meniscus lens between the first meniscus lens and a pixelated detector, wherein the second meniscus lens is tilted at substantially the same fixed angle of incidence relative to the optical axis of the focused laser beam as the first meniscus lens and is rotated about 90° relative to the first meniscus lens.

20 Claims, 8 Drawing Sheets

SYSTEM AND METHOD FOR PROFILING A LASER BEAM OVER A GALVANOMETER SCAN FIELD

BACKGROUND OF THE INVENTION

Galvanometer optical scanners, also commonly referred to as galvos or galvo scanners, are motorized systems used for laser beam steering or scanning applications. Galvo scanners are ideal for quickly, accurately, and precisely moving small laser beams. Galvanometer scanners are found wherever laser beams are steered including materials processing, laser light shows, manufacturing, packaging, cutting, marking, welding, and numerous other applications.

In galvo scanners a laser beam is constantly moving over a scan field. Profiling the laser beam for galvo scanners is a difficult task given the motion dynamics and the high power of the focused laser beam. A known device for profiling a focused laser beam is a pixelated detector, such as a CMOS (complementary metal-oxide semiconductor) sensor, CCD (charged coupled device) sensor or any other suitable two-dimensional array. The problem with these sensors is that they can only handle microwatts of power, however the lasers used industrially for galvo scanners are in the watts to kilowatts levels of power. Consequently, some type of attenuation of the laser is necessary, however attenuation further complicates the measurement as attenuation techniques are known to introduce undesirable beam aberrations.

Additionally, most industrial laser scanner systems are non-telecentric, wherein the laser beam strikes the processing field over an angular range on the order of greater than +/−20 degrees. At this extreme angle, the normally round laser beam becomes elliptical due to the tilting of the beam at the surface, even though the beam is focused. This is due to the angular conic slice within the scan field. While this problem can be overcome with a telecentric optical design, these types of systems are much more optically complex and generally have much smaller scan fields because of this complexity and therefore are not as common as the non-telecentric systems.

Accordingly, there is a need in the art for a system and method for evaluating the focused laser beam at any location of the scan field without altering the beam by profiling the beam as the material being processed by the laser would see the light.

However, in view of the art considered as a whole at the time the present invention was made, it was not obvious to those of ordinary skill in the art how the limitations of the art could be overcome.

SUMMARY OF THE INVENTION

In various embodiments, the present invention provides a method and apparatus for profiling a focused laser beam over a galvanometer scan field.

In one embodiment, a system for profiling a focused laser beam of a galvanometer scanner includes an attenuation optic positioned to receive a focused laser beam from a laser beam source of a galvanometer scanner. The attenuation optic includes a first meniscus lens and a second meniscus lens separated from the first meniscus lens. The first meniscus lens has a first surface with a radius of curvature and a highly reflective coating positioned to face the focused laser beam source and a second surface opposite the first surface with a radius of curvature and an antireflection coating, wherein the first meniscus lens is tilted at a fixed angle of incidence relative to an optical axis of the focused laser beam. The second meniscus lens has a first surface with a radius of curvature and a highly reflective coating positioned to face the second surface of the first meniscus lens and a second surface opposite the first surface with a radius of curvature and an antireflection coating, wherein the second meniscus lens is tilted at substantially the same fixed angle of incidence relative to the optical axis of the focused laser beam as the first meniscus lens and is rotated about 90° relative to the first meniscus lens. In particular, the radius of curvature of the first surface of the first meniscus lens, the radius of curvature of the second surface of the first meniscus lens, the radius of curvature of the first surface of the second meniscus lens and the radius of curvature of the second surface of the second meniscus lens are substantially equal. The system further includes, a pixelated detector positioned parallel to a scan field of the galvanometer scanner to receive the focused laser beam from the second meniscus lens.

The attenuation optic may further include one or more filters positioned between the second surface of the second meniscus lens and the pixelated detector, wherein the one or more filters have a normal angle of incidence relative to the optical axis of the focused laser beam.

The system may further include an optical axis adjuster coupled to the attenuation optic. The optical axis adjuster is configured to adjust the angle of incidence of the attenuation optic to maintain the fixed angle of incidence of the first meniscus lens and the second meniscus lens and to maintain the normal angle of incidence of the one or more filters relative to the optical axis of the focused laser beam over a scan area of the galvanometer scanner.

The system may further include a pixelated detector adjuster coupled to the pixelated detector. The pixelated detector adjuster is configured to position the pixelated detector to receive the focused laser beam as the galvanometer scanner moves over the scan field.

In an additional embodiment, a method for profiling a focused laser beam of a galvanometer scanner is provided. The method includes positioning an attenuation optic to receive a focused laser beam from a laser beam source of a galvanometer scanner. The attenuation optic includes a first meniscus lens and a second meniscus lens separated from the first meniscus lens. The first meniscus lens has a first surface with a radius of curvature and a highly reflective coating positioned to face the focused laser beam source and a second surface opposite the first surface with a radius of curvature and an antireflection coating, wherein the first meniscus lens is tilted at a fixed angle of incidence relative to an optical axis of the focused laser beam. The second meniscus lens has a first surface with a radius of curvature and a highly reflective coating positioned to face the second surface of the first meniscus lens and a second surface opposite the first surface with a radius of curvature and antireflection coating, wherein the second meniscus lens is tilted at substantially the same fixed angle of incidence relative to the optical axis of the focused laser beam as the first meniscus lens and is rotated about 90° relative to the first meniscus lens. In particular, the radius of curvature of the first surface of the first meniscus lens, the radius of curvature of the second surface of the first meniscus lens, the radius of curvature of the first surface of the second meniscus lens and the radius of curvature of the second surface of the second meniscus lens are substantially equal.

The method further includes, positioning a pixelated detector parallel to a scan field of the galvanometer scanner to receive the focused laser beam from the second meniscus lens. The method additionally includes, attenuating the focused laser beam received at the attenuation optic, transmitting the attenuated focused laser beam to the pixelated detector and measuring the attenuated focused laser beam at the pixelated detector to profile the focused laser beam from the laser beam source of the galvanometer scanner.

The method may further include positioning one or more filters in the attenuation optic between the second surface of the second meniscus lens and the pixelated detector, wherein the one or more filters has a normal angle of incidence relative to the optical axis of the focused laser beam.

The method may further include coupling an optical axis adjuster to the attenuation optic, the optical axis adjuster to adjust the angle of incidence of the attenuation optic to maintain the fixed angle of incidence of the first meniscus lens and the second meniscus lens relative to the optical axis of the focused laser beam and to maintain the normal angle of incidence of the one or more filters relative to the optical axis of the focused laser beam over a scan area of the galvanometer scanner.

The method may further include coupling a pixelated detector adjuster to the pixelated detector. The pixelated detector adjuster is configured to position the pixelated detector to receive the focused laser beam as the galvanometer scanner moves over the scan field.

As such, in various embodiments, the present invention provides a system and method for evaluating a focused laser beam from a galvanometer scanner at any location within the scan field without altering the laser beam.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

In various embodiments, the present invention provides for laser beam profiling of a scan field for a high-power laser galvanometer system used in any two-dimensional scan field of a galvanometer scanner that directs a focused laser beam over a large field for marking, cutting, drilling, 3-D additive powder beds, or various other high-power laser applications employing a galvo scanner device. The system and method of the present invention are effective in attenuating a high-power laser beam so that it can be viewed by a pixelated detector without introducing any aberration to the laser beam and thereby providing the ability to directly measure the profile of the focused laser beam at any location within the scan field of a laser-based galvanometer scanner system.

Laser beam profile mapping of a galvanometer scan field, such as a 3-D additive powder bed or a scan field of a 2-D F-Theta lens galvanometer, has previously not been achievable without requiring complex methods or covering only a limited area of the scan field. The current systems known in the art do not provide users of 3-D additive machines with high certainty what the laser beam looks like in the extremes of the scan field. Assuming one starts with a perfect Gaussian beam in the 0,0 position of the scan field, the round beam at an extreme corner of the scan field will become an elliptical beam for any non-telecentric scanner system due to the angle of the beam at the extreme field position. This further assumes that the scanner is diffraction limited and has no aberrations at these extreme field points. The difficultly lies in both the high power of several hundred watts to more than a kilowatt of continuous wave lasers and the angular movement of the beam across the scan field, which makes the attenuation of the beam challenging without creating aberration in the source beam. In the various embodiments of the present invention, a system and method for mapping a large scan field of a laser-based scanner can now be accomplished for a 3-D additive system with laser power of more than 1 kilowatt. Additionally, the provided system is compact, aberration free, fast, and very easy to use.

In various embodiments, the present invention provides a beam attenuation system and method of use that does not contribute to aberration of the focused laser beam from a galvanometer scanner.

Broadly, the beam attenuation system of the present invention is comprised of two highly reflective mirrors that are positioned at an angle of incidence with respect to the optical axis of the laser beam and each mirror is tilted in opposite axes to one another by 90°. In general, the first attenuation mirror is positioned to receive the laser beam light from the laser beam of the galvanometer scanner, is comprised of a suitable substrate for the light being measured and has a highly reflective coating of >99% on a first surface and an antireflection coating on a second surface with a reflectivity of <1.0%. The second attenuation mirror has a coating and substrate comparable to the first attenuation mirror. A suitable substrate for the reflective mirrors may be a fused silica for a high-power fiber laser or ZnSe (zinc selenide) for a $CO_2$ laser. If the power level of the transmitted light is low enough to not cause thermal lensing, an absorbing material substrate may be used so that any ghost images formed by the second surface reflections of the two mirrors are mitigated and are not detected at the pixelated detector. This absorbing substrate having a highly reflective coating can be positioned anywhere prior to the pixelated detector if the power is very high through the first two attenuation mirrors. The combination of the two attenuation mirrors provided by the present invention allows the laser light to be focused directly onto the pixelated detector without aberrating the beam.

Figure 1:
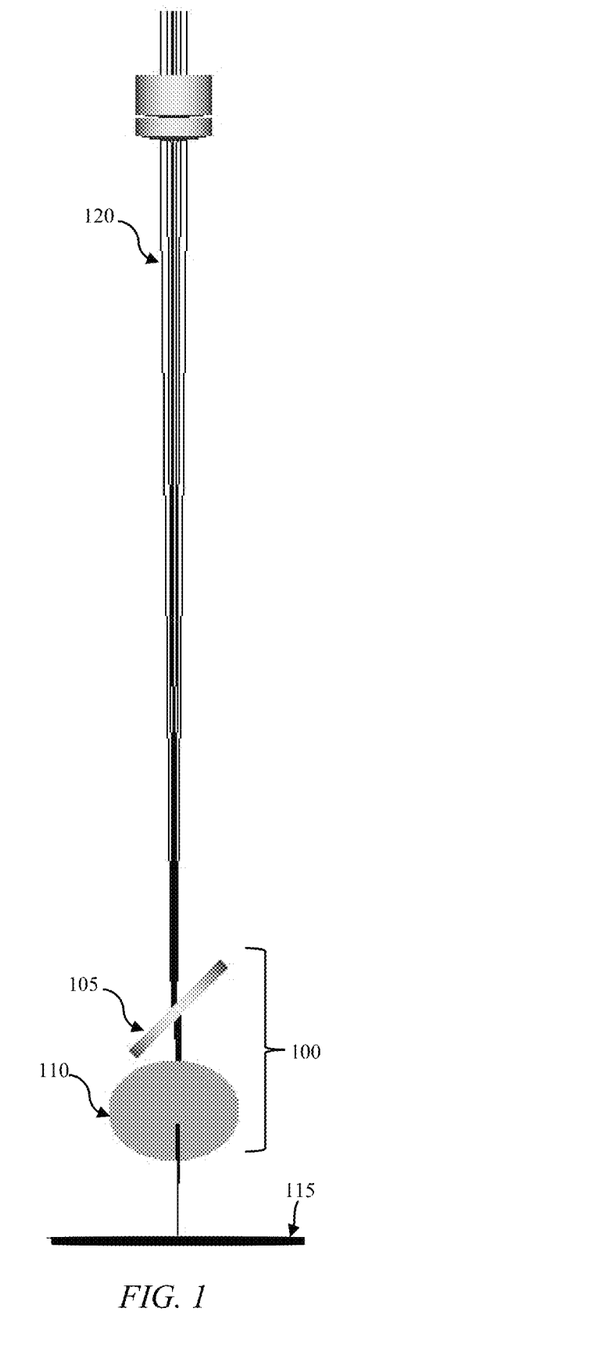
FIG. 1 is a diagram illustrating a system having an attenuation optic comprising two optic elements for attenuating a laser beam without introducing an aberration into the laser beam, in accordance with an embodiment of the present invention.

With reference to FIG. 1, in one embodiment, an attenuation optic 100 comprises a first attenuation mirror 105 and a second attenuation mirror 110. The attenuation optic 100 is positioned to receive a focused laser beam 120 from a laser beam source of a galvanometer scanner. In this embodiment, the first attenuation mirror 105 and the second attenuation mirror 110 are positioned at a 45° angle of incidence with respect to the optical axis of the laser beam 120. As will later be described, a 22.5° angle of incidence may be a more preferable orientation, but to demonstrate the influence of the tilted optics in the focused laser beam 120, the 45° angle of incidence will serve for discussing the optical aberration issue. As shown, the first attenuation mirror 105 and the second attenuation mirror 110 are tilted in opposite axes to one another by 90°. The portion of the laser beam exiting the second attenuation mirror 110 is measured by the pixelated detector 115, which is positioned parallel to a scan field of the galvanometer scanner.

Figure 2A:
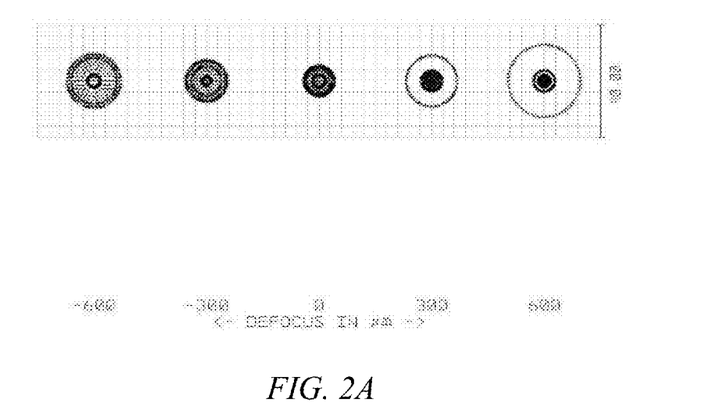
FIG. 2A is a spot diagram illustrating a laser profile without the attenuation optic of the present invention.
Figure 2B:
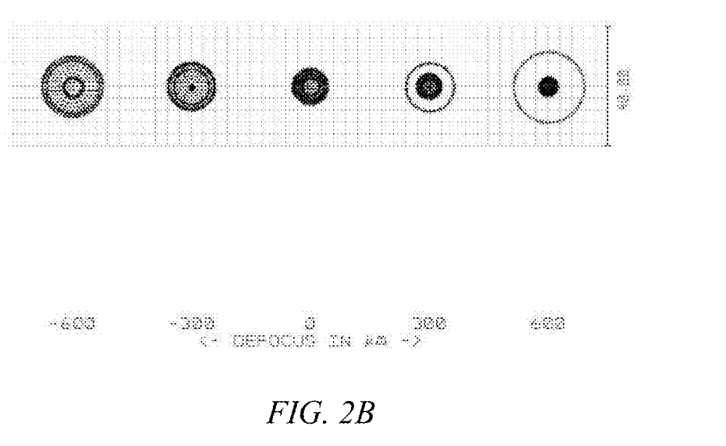
FIG. 2B is a spot diagram illustrating a laser profile incorporating the attenuation optic of the present invention.
Figure 3:
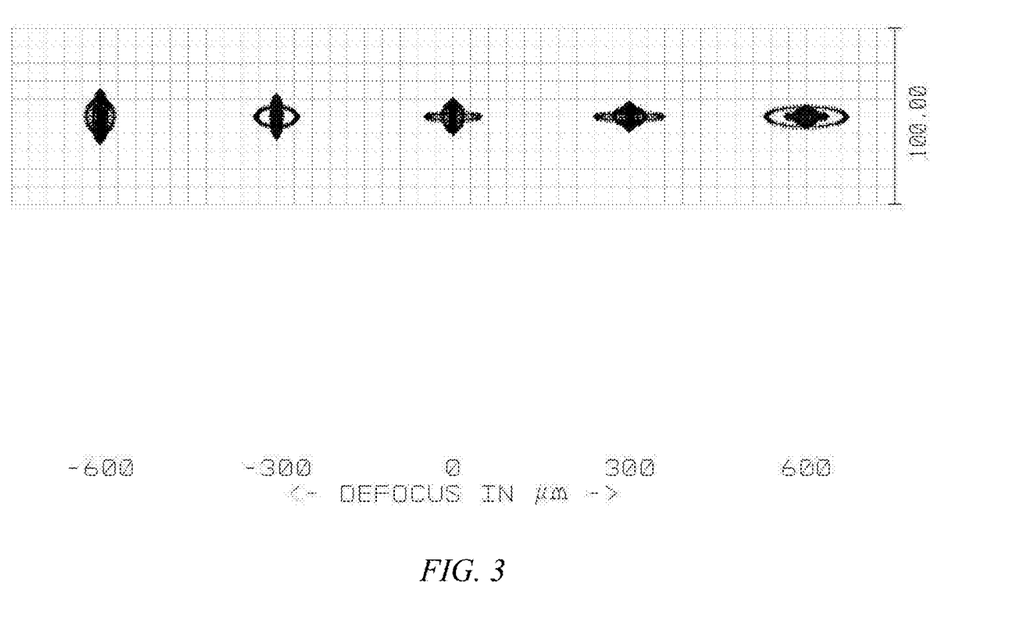
FIG. 3 is a spot diagram illustrating a laser profile with one of the mirrors in the attenuation optic removed.

FIG. 2A shows a through focus spot diagram of the beam from FIG. 1 and the same beam with no attenuation optics is shown in FIG. 2B. As can be seen, there is no change in the optical performance, so the attenuation optic 100 of the present invention provides the attenuation without introducing deleterious aberrations. When one removes either one of the attenuation mirrors 105, 110, the lack of the second attenuation mirror that is rotated 90° with respect to the first attenuation mirror, results in the through focus spot diagram shown in FIG. 3, which is drastically changed. As such, it is shown that with only one tilted attenuation mirror, the optical path length in one axis is the square root of two times the thickness of the window longer than the other, which will obviously create astigmatism from this different path length between the two axes.

While FIG. 1 depicts the basic principle of the present invention, there are other embodiments that provide benefits for dumping the reflected high-power laser radiation and are therefore more desirable.

Figure 4A:
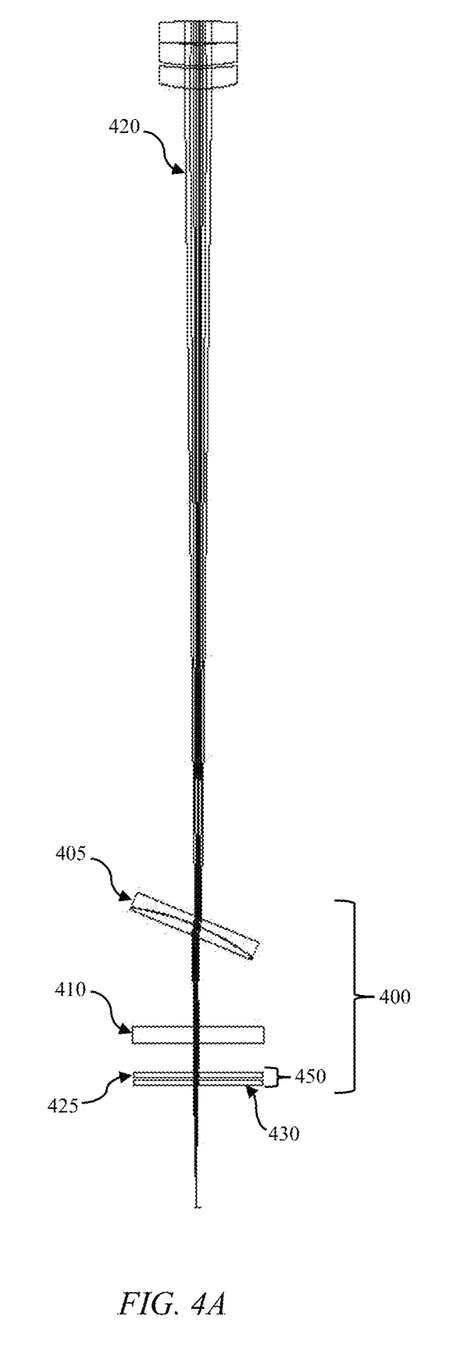
FIG. 4A is a diagram illustrating a cross-sectional view of a system having an attenuation optic comprising one plano-convex optic element and one plano-concave optic element for attenuating a laser beam without introducing an aberration into the laser beam, in accordance with an embodiment of the present invention.
Figure 4B:
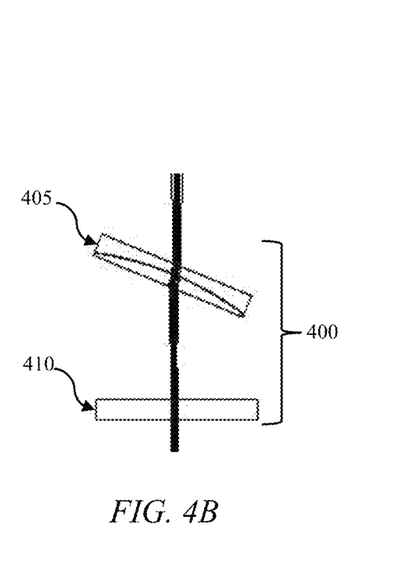
FIG. 4B is a zoomed view of the attenuation optic illustrated in FIG. 4A.

FIG. 4A and FIG. 4B illustrate an attenuation optic 400 comprising a first optic 405 and a second optic 410. The first optic 405 comprises a plano-concave element and a plano-convex element, wherein the plano-concave element and the plano-convex element have substantially equal but opposite sign radius of curvatures. The second optic 410 also comprises a plano-concave element and a plano-convex element with the plano-concave element and the plano-convex element having substantially equal but opposite sign radius of curvatures. The radius of curvature of these two optics 405, 410 are substantially equal to one another, thereby causing no "optical power" from these two optics being in close proximity, but never touching each other. The spacing of the optics 405, 410 may be <1 mm to mitigate the power influence. In this embodiment, the concave surface of the plano-concave element 405 has a highly reflective coating, such that <1.0% of the light 420 is transmitted. The plano surface of the plano-concave element 405 has an antireflection coating with a reflectivity of <1.0%. The convex surface of the plano-convex element 410 has a highly reflective coating, such that <1.0% of the light 420 is transmitted. The plano surface of the plano-convex element 410 has an antireflection coating with a reflectivity of <1.0%. The first optic 405/second optic 410 combination is tilted at a 22.5° angle to allow the reflected light from the concave surface of the first optic 405 which would cause the substantially reflected light to begin expanding toward a beam dump (not shown) after reflection from the concave surface. The attenuation optic 400 further includes a filter pair 450 that has the same optical thickness of the plano-concave 405/plano-convex 410 element pair. The filter pair 450 comprises a laser light passing filter 425 and a neutral density filter 430. The laser light passing filter 425 may be a short pass filter, a long pass filter, a narrow bandpass filter or any other filter known in the art that is effective in blocking unwanted residual light and passes the laser light to be incident upon the pixelated detector. The filter pair 450 is substantially at normal incidence to the focused laser beam 420.

Figure 5:
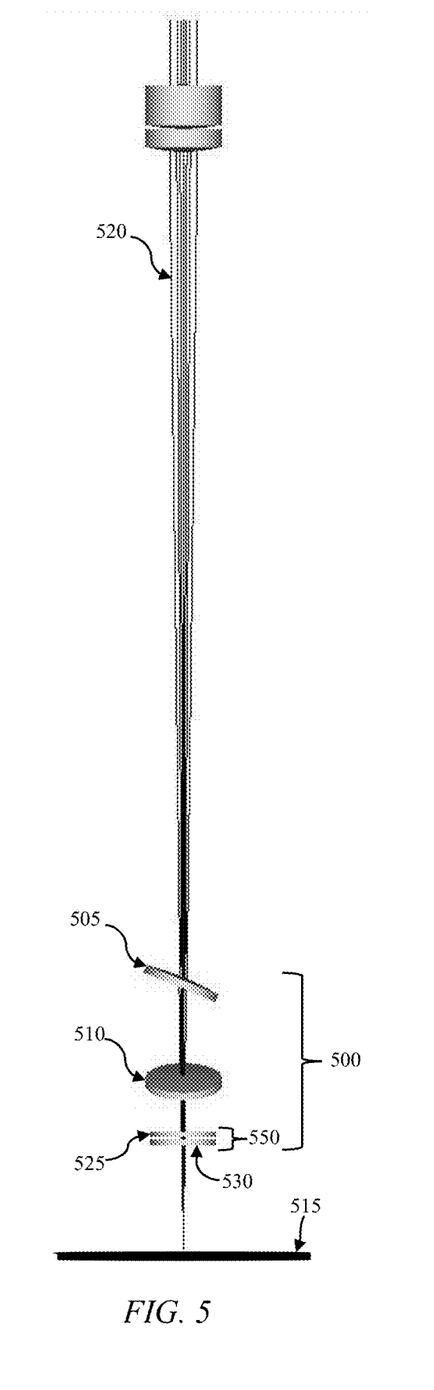
FIG. 5 is a diagram illustrating a system having an attenuation optic comprising two meniscus lenses for attenuating a laser beam without introducing an aberration into the laser beam, in accordance with an embodiment of the present invention.

An additional embodiment for providing divergent reflections without adding any optical power to the attenuation optic pair is illustrated in FIG. 5. As shown in FIG. 5 a system for profiling a focused laser beam of a galvanometer scanner includes an attenuation optic 500 positioned to receive a focused laser beam 520 from a laser beam source of a galvanometer scanner. The attenuation optic 500 includes a first meniscus lens 505 and a second meniscus lens 510 separated from the first meniscus lens 505. The first meniscus lens 505 has a first surface with a radius of curvature and a highly reflective coating positioned to face the focused laser beam source 520 and a second surface opposite the first surface with a radius of curvature and an antireflection coating, and the first meniscus lens 505 is tilted at a fixed angle of incidence relative to an optical axis of the focused laser beam 520. The second meniscus lens 510 has a first surface with a radius of curvature and a highly reflective coating positioned to face the second surface of the first meniscus lens 505 and a second surface opposite the first surface with a radius of curvature and an antireflective coating, and the second meniscus lens 510 is tilted at substantially the same fixed angle of incidence relative to the optical axis of the focused laser beam 520 as the first meniscus lens 505 and is rotated about 90° relative to the first meniscus lens 505. In particular, the radius of curvature of the first surface of the first meniscus lens 505, the radius of curvature of the second surface of the first meniscus lens 505, the radius of curvature of the first surface of the second meniscus lens 510 and the radius of curvature of the second surface of the second meniscus lens 510 are substantially equal. The attenuation optic may further include a filter element 550, which may include a laser light passing filter 525 and a neutral density filter 530, as previously described. The filter element 550 is positioned at a normal angle of incidence relative to the optical axis of the focused laser beam 520. The system further includes a pixelated detector 515 positioned parallel to a scan field of the galvanometer scanner, the pixelated detector to receive the focused laser beam from the second meniscus lens 510.

Figure 6A:
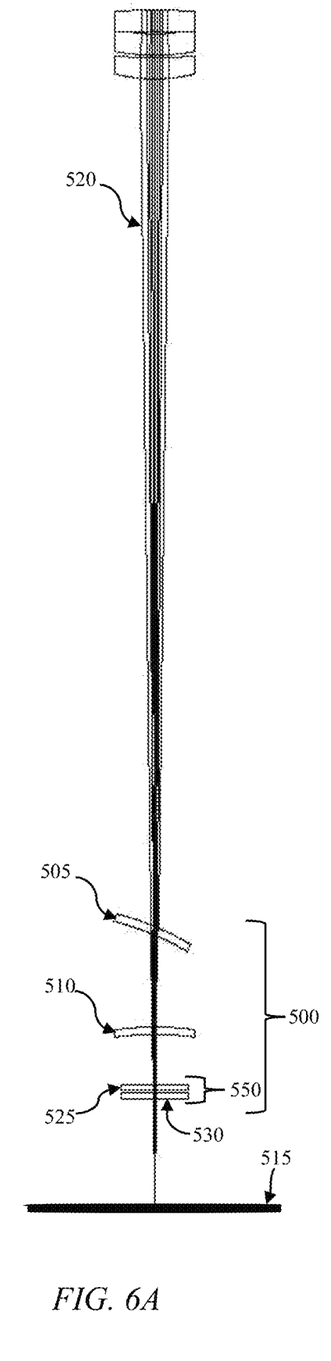
FIG. 6A is a cross-sectional view of the system of FIG. 5 having an attenuation optic comprising two meniscus lenses for attenuating a laser beam without introducing an aberration into the laser beam, in accordance with an embodiment of the present invention.
Figure 6B:
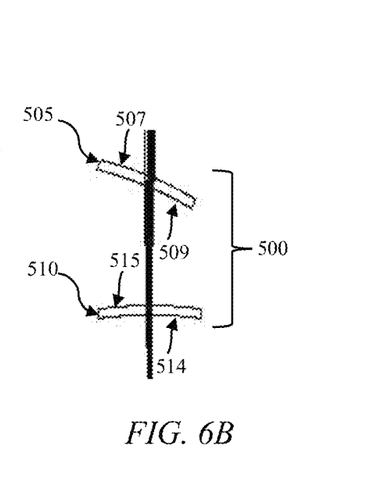
FIG. 6B is a zoomed view of the attenuation optic of FIG. 6A.

A cross-sectional view of the embodiment of FIG. 5 is shown in FIG. 6A and FIG. 6B. FIG. 6B is a zoomed version of the attenuation optic 500 of FIG. 6A. As in FIG. 5, the lenses of the attenuation optic 500 are substantially meniscus lens 505, 510 in that the radius of curvature are substantially equal for the first surface 507 and the second surface 509 of the first meniscus lens 505 and for the first surface 512 and the second surface 514 of the second meniscus lens 510. This fact provides no optical power to adversely influence the focused beam 520 transmitting through these lenses 505, 510. The first surface 507 of the first meniscus lens 505 has a >99% high reflective coating and transmits <1% of the light 520. The second surface 509 of the first meniscus lens 505 has an antireflection coating with <1% reflectivity. The second meniscus lens 510 has the same coatings as the first meniscus lens 505 but is rotated 90° relative to the first meniscus lens 505 for the nominal 22.5° tilt. As such, the optical path length in the X and Y axes of the laser beam 520 is substantially equal so as not to add any optical aberration, along with a form factor that adds no optical power to the beam 520.

The preferred angle of incidence of the first meniscus lens 505 and the second meniscus lens 510 is 22.5°, as previously described. The reason for this is that at an extreme angle, there will be less vignetting of the beam 520 as compared with the more commonly used 45° and further, the 22.5° angle of incidence allows the optics to more compressed to keep the system as compact as possible. Having an even shallower angle is possible, but the problem becomes handling the reflected high power laser radiation. The 22.5° angle of incidence is not intended to be limiting and an angle of incidence between about 10° and 45° is considered within the scope of the invention.

Figure 7:
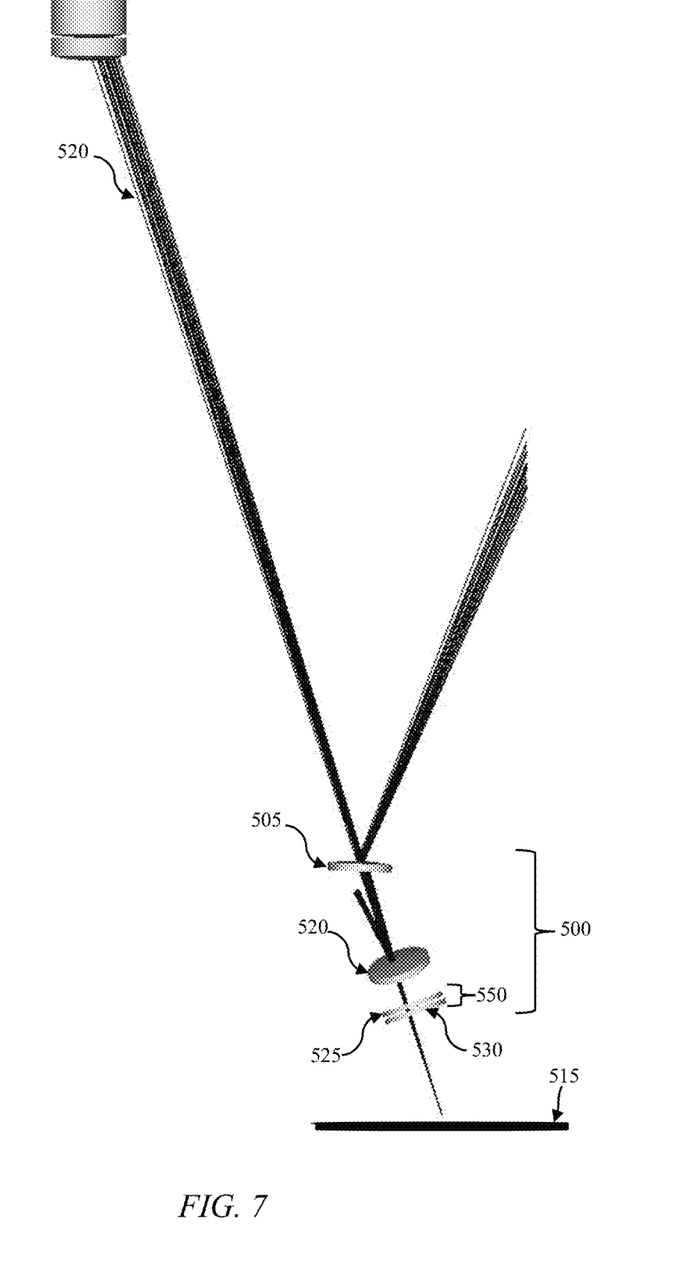
FIG. 7 is a diagram illustrating the system of FIG. 5 further including an optical axis adjuster for adjusting the angle of the attenuation optic based upon the angle of the laser beam relative to the scan field and a pixelated detector adjuster to adjust the location of the pixelated detector within the scan field, in accordance with an embodiment of the present invention.

As the galvanometer scanner can move the focused laser beam 520 to greater than +/−20 degrees, a mechanism is provided to angle the attenuation optic 500 so that the fixed angle of incidence of the first meniscus lens 505 and the fixed angle of the second meniscus lens 510 is maintained, as shown in FIG. 7. This mechanism ensures that the optical path length is always the same at any point in the scan field. The adjustment of the angle of the attenuation optic 500 may be accomplished by a gimbal adjustment of the attenuation optic 500 and a rotational adjustment of the attenuation optic 500 so that an aberration free beam can be presented to the pixelated detector 515 at any point on the scan field in the same manner, thus making the optical beam path constant. Various gimbal adjustment and rotational adjustment devices are well known in the art.

The area of the pixelated detector 515 is smaller than the area of the scan field of the galvanometer scanner. As such, it is necessary to move the pixelated detector 515 in the X-Y direction as the focused laser beam 520 is moved by the galvanometer scanner. To position the pixelated detector 515 to receive the focused laser beam 520 over the scan field, the system may further include a pixelated detector adjuster coupled to the pixelated detector 515. The pixelated detector adjuster is configured to track the position of the galvanometer scanner and to position the pixelated detector 515 to receive the focused laser beam 520 as the galvanometer scanner moves over the scan field. The pixelated detector adjuster may be manual or motorized to provide X-Y positioning of the pixelated detector 515 in the scan field. Various manual and motorized adjustment mechanisms are well known in the art for providing the adjustment of the pixelated detector 515.

In a specific embodiment of the system of the present invention, the optical axis adjuster that is coupled to the attenuation optic 500 and the pixelated detector adjustor that is coupled to the pixelated detector 515 may be comprised of four motors. A first motor is configured to tilt the attenuation optic 500 to match the angle of the galvanometer scanner so that the angle of incidence of the focused laser beam 520 beam is always at the preferred 22.5°. A second motor is configured to rotate the attenuation optic 500 to accommodate any X-Y coordinate section over the scan field as well as to maintain the nominal 22.5° angle of incidence to the meniscus lenses 505, 510. The third and fourth motors are configured to position the entire system in the X-Y plane of the scan field so that the pixelated detector 515 will be able to accept the focused laser beam 520 into its field of view, i.e., sensor.

It is further desired to have a light blocking filter such that the pixelated detector 515 will only see the laser wavelength and no ambient light and it is desirable to have additional neutral density filtration to ensure the pixelated detector 515 is not overexposed to the laser radiation. As shown in FIG. 7, to accomplish this, the attenuation optic may further include a filter pair 550 including a laser light passing filter 525 and a neutral density filter 530, or an absorbing filter with a high reflective coating on one surface, may be positioned at a small angle below the second meniscus lens 510. The laser light passing filter 525 and the neutral density filter 530 are at a normal angle of incidence relative to the optical axis of the focused laser beam 520 and move with the attenuation optic 500 to maintain the normal angle of incidence throughout the range of the scan field. It is important to note that the pixelated detector 515 itself does not tilt but is always parallel to the plane of the scan field. For a given location of the pixelated detector 515, the user would be able to scan the clear aperture of the pixelated detector 515. The position of the attenuation optic 500 and the pixelated detector 515 would ideally be synchronized with the motion of the galvanometer system so a user would be able to provide a detailed profile mapping of the entire scan field of the resolution limited only by the pixel size of the pixelated detector 515. The device, therefore, would have 4 axes of motion: gimbal tilt and rotation of the attenuation optic 500; X and Y positioning of the attenuation optic 500 and pixelated detector 515 about the scan field.

Figure 8:
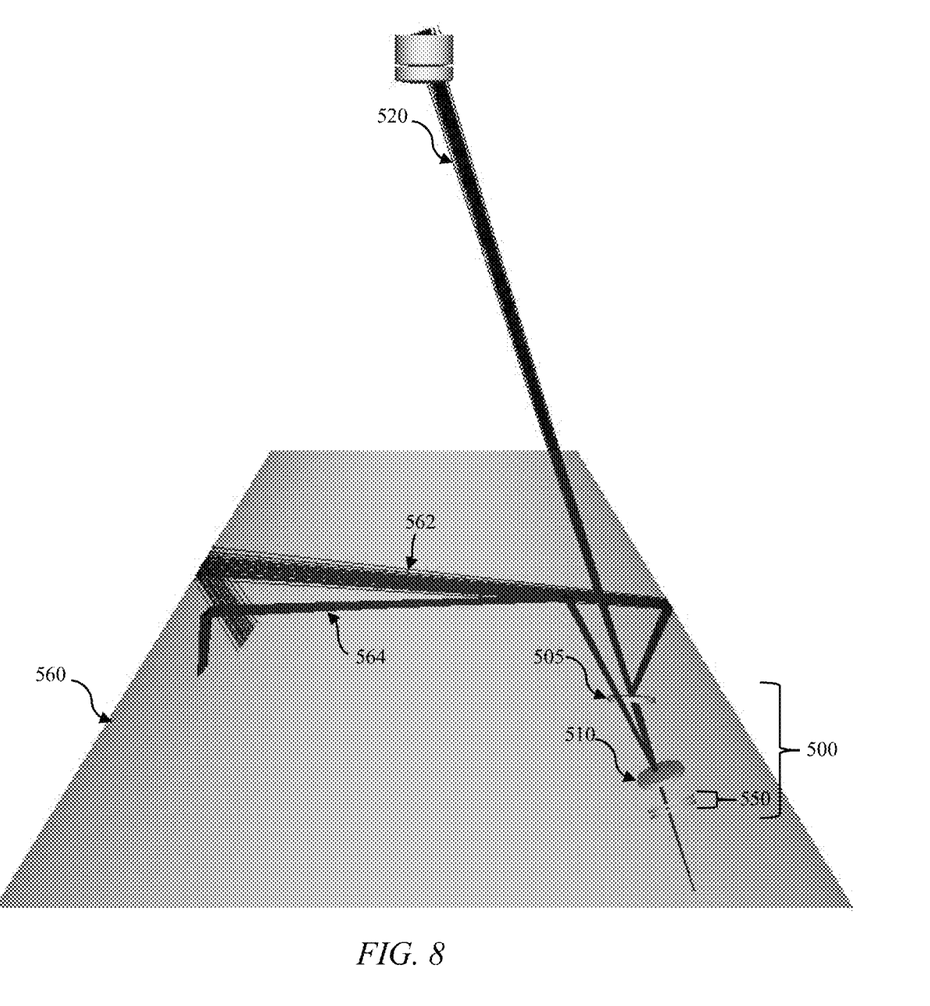
FIG. 8 is a diagram illustrating the system of FIG. 7 including a beam dump.

In an additional embodiment, the profiling system of FIG. 7 may further include a beam dump to handle the reflected high power laser radiation. Beam dumps are well known in the art. In one embodiment shown in FIG. 8, a cone shaped beam dump 560 may be positioned to surround the attenuation optic 500 so that the reflected high-power light 562, 564 from the attenuation optic 500 is blocked by the beam dump 560. While this example of a beam dump is large and cone shaped, any beam dump that would block the reflection from the first meniscus lens 505 would be sufficient to prevent damage to the surrounding area. A single blocking plate, for example, placed in the direction of the reflected beam 562, 564 would suffice or even a square sided dump placed around the scan field would as well provide protection.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A system for profiling a focused laser beam of a galvanometer scanner, the system comprising:
    an attenuation optic positioned to receive a focused laser beam from a laser beam source of a galvanometer scanner, the attenuation optic comprising;
        a first meniscus lens having a first surface having a radius of curvature and a reflective coating positioned to face the focused laser beam source and a second surface opposite the first surface having a radius of curvature and an antireflection coating, wherein the first meniscus lens is tilted at a fixed angle of incidence relative to an optical axis of the focused laser beam;
        a second meniscus lens having a first surface having a radius of curvature and a reflective coating positioned to face the second surface of the first meniscus lens and a second surface opposite the first surface having a radius of curvature and an antireflection coating, wherein the second meniscus lens is tilted at substantially the same fixed angle of incidence relative to the optical axis of the focused laser beam as the first meniscus lens and is rotated about 90° relative to the first meniscus lens;
    wherein the radius of curvature of the first surface of the first meniscus lens, the radius of curvature of the second surface of the first meniscus lens, the radius of curvature of the first surface of the second meniscus lens and the radius of curvature of the second surface of the second meniscus lens are substantially equal; and
    a pixelated detector positioned parallel to a scan field of the galvanometer scanner, the pixelated detector to receive the focused laser beam from the second meniscus lens.

2. The system of claim 1, wherein the fixed angle of incidence of the first meniscus lens and the second meniscus lens relative to the optical axis of the focused laser beam is between about 10° and about 45°.

3. The system of claim 1, wherein the fixed angle of incidence of the first meniscus lens and the second meniscus lens relative to the optical axis of the focused laser beam is approximately 22.5°.

4. The system of claim 1, wherein the reflective coating of the first surface of the first meniscus lens and the reflective coating of the first surface of the second meniscus lens have a reflectivity of greater than about 99%.

5. The system of claim 1, wherein the antireflective coating of the second surface of the first meniscus lens and the antireflective coating of the second surface of the second meniscus lens have a reflectivity of less than about 1%.

6. The system of claim 1, wherein the first meniscus lens has a substrate comprising a laser glass based upon the laser beam source.

7. The system of claim 1, wherein the second meniscus lens has a substrate selected from a laser glass based upon the laser beam source and an absorbing glass having an optical density (OD) of at least −1.

8. The system of claim 1, further comprising a beam dump positioned to receive a portion of the focused laser beam reflected from the attenuation optic.

9. The system of claim 1, further comprising a pixelated detector adjuster coupled to the pixelated detector, wherein the pixelated detector adjuster is configured to position the pixelated detector to receive the focused laser beam as the galvanometer scanner moves over the scan field.

10. The system of claim 1, wherein the attenuation optic further comprises one or more filters selected from a laser light passing filter and a neutral density filter positioned between the second surface of the second meniscus lens and the pixelated detector, the one or more filters having a normal angle of incidence relative to the optical axis of the focused laser beam.

11. The system of claim 10, further comprising an optical axis adjuster coupled to the attenuation optic, the optical axis adjuster to adjust the angle of incidence of the attenuation optic to maintain the fixed angle of incidence of the first meniscus lens and the second meniscus lens and to maintain the normal angle of incidence of the one or more filters relative to the optical axis of the focused laser beam over a scan area of the galvanometer scanner.

12. A method for profiling a focused laser beam of a galvanometer scanner, the method comprising:
    positioning an attenuation optic to receive a focused laser beam from a laser beam source of a galvanometer scanner, the attenuation optic comprising;
        a first meniscus lens having a first surface having a radius of curvature and a reflective coating positioned to face the focused laser beam source and a second surface opposite the first surface having a radius of curvature and an antireflection coating, wherein the first meniscus lens is tilted at a fixed angle of incidence relative to an optical axis of the focused laser beam;
        a second meniscus lens having a first surface having a radius of curvature and a reflective coating positioned to face the second surface of the first meniscus lens and a second surface opposite the first surface having a radius of curvature and an antireflection coating, wherein the second meniscus lens is tilted at substantially the same fixed angle of incidence relative to the optical axis of the focused laser beam as the first meniscus lens and is rotated about 90° relative to the first meniscus lens;
    wherein the radius of curvature of the first surface of the first meniscus lens, the radius of curvature of the second surface of the first meniscus lens, the radius of curvature of the first surface of the second meniscus lens and the radius of curvature of the second surface of the second meniscus lens are substantially equal;
    positioning a pixelated detector parallel to a scan field of the galvanometer scanner, the pixelated detector to receive the focused laser beam from the second meniscus lens;
    attenuating the focused laser beam received at the attenuation optic and transmitting the attenuated focused laser beam to the pixelated detector; and
    measuring the attenuated focused laser beam at the pixelated detector to profile the focused laser beam from the laser beam source of the galvanometer scanner.

13. The method of claim 12, wherein the fixed angle of incidence of the first meniscus lens and the second meniscus lens relative to the optical axis of the focused laser beam is between about 10° and about 45°.

14. The method of claim 12, wherein the fixed angle of incidence of the first meniscus lens and the second meniscus lens relative to the optical axis of the focused laser beam is approximately 22.5°.

15. The method of claim 12, wherein the reflective coating of the first surface of the first meniscus lens and the reflective coating of the second surface of the second meniscus lens have a reflectivity of greater than about 99%.

16. The method of claim 12, wherein the antireflection coating of the second surface of the first meniscus lens and the antireflection coating of the second surface of the second meniscus lens have a reflectivity of less than about 1%.

17. The method of claim 12, further comprising positioning a beam dump to receive a portion of the focused laser beam reflected from the attenuation optic.

18. The method of claim 12, further comprising coupling a pixelated detector adjuster to the pixelated detector, wherein the pixelated detector adjuster is configured to position the pixelated detector to receive the focused laser beam as the galvanometer scanner moves over the scan field.

19. The method of claim 12, positioning one or more filters selected from a laser light passing filter and a neutral density filter in the attenuation optic between the second surface of the second meniscus lens and the pixelated detector, the one or more filters having a normal angle of incidence relative to the optical axis of the focused laser beam.

20. The method of claim 19, further comprising coupling an optical axis adjuster to the attenuation optic, the optical axis adjuster to adjust the angle of incidence of the attenuation optic to maintain the fixed angle of incidence of the first meniscus lens and the second meniscus lens relative to the optical axis of the focused laser beam and to maintain the normal angle of incidence of the one or more filters relative to the optical axis of the focused laser beam over a scan area of the galvanometer scanner.

* * * * *